United States Patent [19]

Rossio

[11] 4,076,478

[45] Feb. 28, 1978

[54] MEANS FOR REMOVING A MOLDED COMPONENT FROM A MOLDING MACHINE

[75] Inventor: John H. Rossio, Portage, Mich.

[73] Assignee: LaRos Equipment Company, Inc., Portage, Mich.

[21] Appl. No.: 592,808

[22] Filed: Jul. 3, 1975

[51] Int. Cl.$^2$ .............................................. B29F 1/14
[52] U.S. Cl. .................................. 425/215; 425/218; 425/436 R; 425/556
[58] Field of Search ............... 425/806, 218, 219, 250, 425/436 R, 436 RM, DIG. 51, DIG. 229, 215

[56] References Cited

U.S. PATENT DOCUMENTS

| | | | |
|---|---|---|---|
| 2,992,455 | 7/1961 | Salzman | 425/DIG. 229 |
| 3,121,919 | 2/1964 | Turner | 425/250 |
| 3,134,141 | 5/1964 | Hardy | 425/215 |
| 3,196,483 | 7/1965 | Eyles | 425/DIG. 51 |
| 3,213,490 | 10/1965 | Johnson | 425/250 |
| 3,550,207 | 12/1970 | Strauss | 425/219 |
| 3,724,802 | 4/1973 | Veneria | 425/242 X |
| 3,805,875 | 4/1974 | Dougherty | 425/250 X |

Primary Examiner—Francis S. Husar
Assistant Examiner—William R. Briggs
Attorney, Agent, or Firm—Blanchard, Flynn, Thiel, Boutell & Tanis

[57] ABSTRACT

Method and means for engaging a molded component by an externally positioned handling device during an injection molding operation and prior to the opening of the mold. A passageway is provided to the exterior of the mold from a mold cavity which latter may be a cavity for the forming of a molded part or it may be a runner, the sprue or some combination of two or more thereof. A handling device is positioned adjacent the mold to receive molten material from said passageway during the molding operation and thereby establish a solid connection from said handling device to said molding component. When the mold opens, said molding component may then be removed from the mold with control thereover retained by the handling device for such further processing as desired.

9 Claims, 10 Drawing Figures

MEANS FOR REMOVING A MOLDED COMPONENT FROM A MOLDING MACHINE

FIELD OF THE INVENTION

The invention relates to a method and to apparatus for handling plastics parts subsequent to a molding operation and particularly relates to a method and means by which a molded component, which may be one or more of the molded parts, the runner or the sprue, is or are gripped by a handling device adjacent the mold simultaneously with a molding operation, whereby after the mold opens control will be maintained by said handling device over said component for such further processing thereof as desired. Particularly, in one application of the broad concept, the handling device may comprise means for effecting connection with a portion of a molded component, as the runner system, comprising a runner or a runner and sprue, which means retains control over such runner system while the molded parts are severed therefrom, before or simultaneously with the opening of the mold, and thereafter conducts said runner system to a point spaced from the mold and drops the molded parts into one zone and drops the runner system into a second zone separate from said first zone.

BACKGROUND OF THE INVENTION

The art of providing injection molding equipment as it has developed over the years has reached an extremely high degree of automation in the molding operation itself, in the release of molded parts from the mold and in the automatic separation of the molded parts from the runner system, as above defined, associated therewith. This has provided an extremely efficient molding apparatus with a minimum of labor cost. However, as is well known to the art, the problem of handling the molded parts immediately following their discharge, or withdrawal, from the mold has not been as successfully handled, particularly where there has been involved a molding machine used to make a wide range of sizes and shapes of molded products.

In some instances where the withdrawal and further handling of the molded components, said term referring to any one or more of the molded parts, the runner or the sprue is associated with separating the molded parts from the runners and sprue, it is common to separate the molded parts from the runners and sprue immediately prior to discharge from the mold. This has been successfully automated but in many cases said molded parts must then be separated by hand from the runners and sprue which separation is an expensive and undesirable procedure.

In other cases, where the removal from the mold is for other purposes, such as trimming by a die, punching holes in the molded part or inserting thereinto metal portions which cannot effectively be inserted within the mold, this again has normally required at least a substantial amount of hand manipulation and attempts to automate such procedures have been at least limited to instances of extremely high volume, such as to justify specialized equipment.

For illustrative purposes, the broad concept comprising both the method and apparatus aspects of the invention, are directed toward the problem of separating molded parts from runner systems, said latter comprising either or both of a runner and a sprue and hence further discussion will for the most part be confined to this application. However, it will be fully recognized that such reference to the problem of separating molded parts from runner systems is for illustrative purposes only and should not be considered as limiting.

I am aware that several mechanisms have been offered to the trade for the purpose of effecting such separation of parts and runner systems, and one of such devices which has proven highly successful is illustrated and claimed in my own U.S. Pat. No. 3,789,981. However, all of the devices known to me thus far offered to the trade, including that of my own patent aforesaid, rely upon the separating of the runner system and parts after they have been intermingled and this in all cases requires that the designer of a given separating machine give consideration to the relative sizes and shapes of a given runner system and molded parts. In many instances, particularly where relatively large parts are involved, or parts of roughly the same size as the runner system, the parts cannot be reliably separated from the runner system automatically and hand separation is required.

Accordingly, the objects and purposes of the invention include:

1. To provide a method and means for enabling handling means to establish a positive physical connection with a molded component, comprising one or more of a molded part, a runner or a sprue, within a mold substantially simultaneously with the molding operation and for maintaining connection therewith after the mold opens.

2. To provide a method and means, as aforesaid, which is particularly adapted following the opening of the mold for carrying the molded components with which such connection has been established to a point spaced from the mold for further handling or release as desired.

3. To provide a method and means for separating molded parts from a runner system immediately following an injection molding operation.

4. To provide a method and means, as aforesaid, wherein the parts and runner system never become intermingled but the separation takes place at the mold and immediately directs the parts and runner system into separate collecting zones.

5. To provide apparatus, as aforesaid, wherein a runner system is engaged by removal means prior to the discharge from the mold of the molded parts and hence holds such runner system under suitable control for delivery to a desired point while permitting the parts to drop from the mold into suitable parts collecting means.

6. To provide apparatus, as aforesaid, wherein the engagement between the removal means and the runner system takes place simultaneously with the molding operation.

7. To provide apparatus, as aforesaid, wherein the apparatus involved will be of relatively simple nature and capable of mounting within a molding machine and adjacent the mold without excessive cost and without interfering with the basic operation of the machine.

8. To provide apparatus, as aforesaid, which can be readily manufactured as auxiliary apparatus for application to and use with existing standard molding machines.

Other objects and purposes of the invention will be apparent to persons acquainted with apparatus of this type upon inspection of the accompanying drawings and reading of the following specification.

SUMMARY OF THE INVENTION

The invention proceeds on the basic concept of providing a passageway from some interior portion of the mold to the exterior thereof whereby plastics material in the process of being molded will pass through said passageway to a port defined thereby at the exterior of said mold. During a molding operation, an appropriate handling device is positioned against the side of the mold in register with said port for receiving such plastics material emanating therefrom and thereby establishing a positive connection between said handling device and the material within the mold cavity. When the mold opens, with or without separation of a portion of the molding components from the portion thereof so connected to the handling device, the handling device may then move whatever molding components are connected to it to a point spaced from said mold for either discharge or further processing as desired.

In one particularly advantageous application of this broad concept, same is utilized to effect separation of the molded parts from the runner system. In this application, the molded parts are automatically severed from the runner system, usually simultaneously with the opening of the mold, and the handling device maintains a connection to the runner system, whereby to permit the suitably separated molded parts to drop free from the mold and from the runner system and the runner system is then conveyed into appropriate collection means spaced from the corresponding collection means for the parts. Thus, the molded parts and runner system are never permitted to become intermingled with each other. This makes it possible for the removal means to be not only relatively simple but also to be completely independent of the runner system structure and the size and shape of the molded parts. Hence, a single mechanism will fit virtually any arrangement of molded parts and runner system which can be handled by a given molding machine and the problems arising from the separation of parts and runner systems of many different relative sizes and shapes subsequent to the intermingling thereof are avoided. The removal means is provided with a small recess which is placed in communication with a suitable passageway from the runner, or sprue, of the mold to the exterior of the mold. Thus, simultaneously with the molding operation, a small quantity of plastic passes through said passageway and into an appropriate recess in the removal means. When the parts are separated from the runner system and the mold opened, said parts then drop free while the runner system is retained by the removal means. Hence, the parts and the runner system are separated upon opening of the mold and same never become intermingled. The removal means then moves in any convenient manner to a point spaced from the collecting zone for the molded parts and the runner system is then released into suitable collecting means therefor.

DETAILED DESCRIPTION

Referring now to the drawings, it will be recognized that the method aspects of the invention will be most readily understood if explained in connection with specific means for applying the broader concepts of the invention to a particular problem. Therefore, for illustrative purposes, the invention will be described in detail in connection with the separation of molded parts from a runner system. However, it will be recognized that the method aspects of the invention, both broadly and as specifically applied to separation of molded parts from runner systems may be carried out by a variety of apparatus other than that shown here and hence insofar as the method aspects are concerned, the apparatus herein specifically illustrated and described is presented solely for a more convenient and complete understanding of the invention.

Further, insofar as the apparatus aspects are concerned, it will be recognized that apparatus of the general type may be applied either to a molded part or to a runner system and it will be further recognized that a variety of operations may be performed upon the component to which connection is so made. It will also be recognized that at least as to the broader aspects of the apparatus portion of the invention, the selection of apparatus including means for separating molded parts from runner systems, while novel and of value in and of itself, will also be illustrative of the broader aspects of the invention and capable of a considerable range of specific application.

Figure 1:
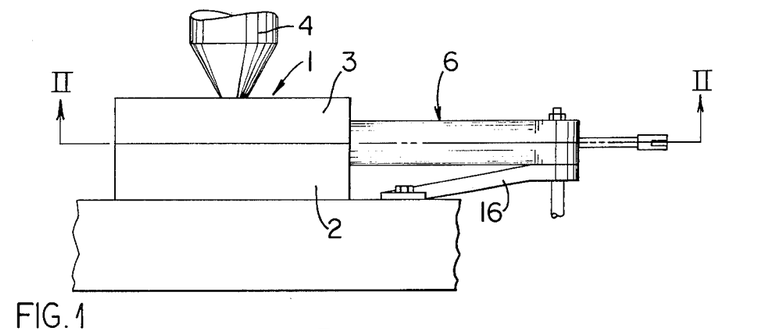
FIG. 1 is a partially schematic view of a conventional mold in association with an injection nozzle of the injection molding machine and in further association with the removal means of the present invention.

Turning now to the specific apparatus and use thereof herein disclosed, there is schematically indicated in FIG. 1 a mold 1 having a first mold half and second mold halves 2 and 3, respectively, which mold halves are supported for appropriate movement toward and away from each other in any conventional manner, not shown. Means 4, here indicated as the discharge end of a conventional injection cylinder, is associated with the first mold half 2 for discharging suitably plasticated plastics material thereinto in a conventional manner for the molding thereof. Said parts thus far described may be arranged in any convenient manner but it will normally be preferable if the parting line of the mold is positioned vertically in order that the molded parts, when properly severed from the runner systems and ejected in a conventional manner, may fall from the mold by gravity. The removal means is indicated generally at 6 and will be described in further detail hereinafter.

Figure 2:
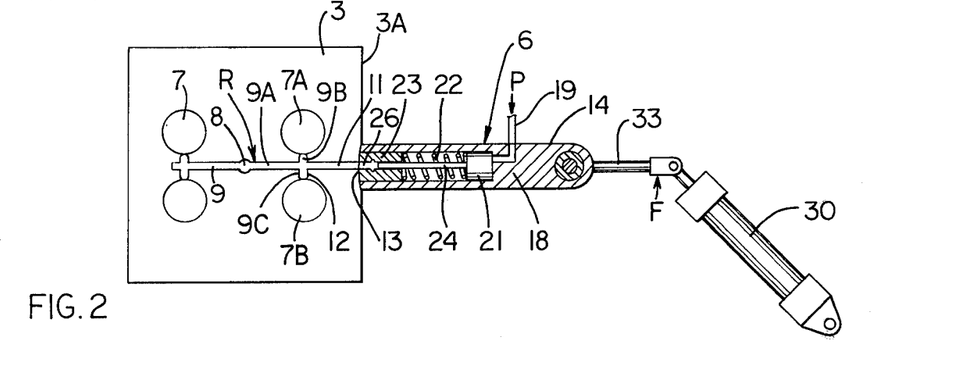
FIG. 2 is a schematic view of the apparatus of FIG. 1 taken on the line II—II of FIG. 1 and showing the lower mold and removal means immediately following the filling of the mold cavity.

Turning now to FIG. 2, there is shown the mold half 3 which is indicated as having four cavities, of which one is indicated at 7, a conventional sprue whose end is indicated at 8 and runners 9. Thus far, the mold half, the mold cavities and the runners are conventional and may be of any size and design desired according to the molding job to be performed. There is, however, according to the invention, added to some portion of the runner system R, here the runner 9, a further passageway 11 extending from the intersection 12 of the main runner 9A with the side runners 9B and 9C leading to the cavities 7A and 7B and extending from said intersection to a port 13 at the surface of the mold.

Positioned alongside of the mold is the removal means 6 which in this embodiment comprises a pressure cylinder 14 mounted in any convenient manner on a bracket 16 for movement around an axis 17. The cylinder comprises a housing 15 containing a cylindrical chamber 18 and a source of fluid pressure P is connected by any suitable conduit, such as indicated at 19, to the chamber 18. A piston 21 is slidably positioned within the chamber 18 for movement, leftward as shown in the drawings, in response to pressure from the source P and may be caused to be retracted rightwardly either by further fluid pressure on the leftward side, if desired, or, more conveniently, by a spring 22. A block 23 closes the end of said chamber 18 but said block has an opening provided therethrough, preferably coaxial with said chamber 18 and into which extends the end of the rod 24 from the piston 21. The length of said rod 24 is such that when the piston 21 is retracted rightwardly, there will be provided a recess 26 in the extreme leftward end of said opening but when said piston is moved leftwardly, said rod 24 will extend through and project outwardly from the block 23. Other means, including mechanical or electrical, may be provided as desired to effect the timed actuation of the rod 24.

The mounting of the removal device 6 is such that the recess 26 may be placed in register with the port 13 when the axis of the housing 15 is approximately perpendicular to the adjacent face 3A of the mold. The contacting surfaces of the mold end and the removal device 6 (said surface for the device 6 consisting of the leftward end of the block 23 together with the leftward end of the housing 15) are preferably contoured and matched, preferably with a slight curve whose center is on the axis 17, so as to provide a seal therebetween which is at least substantially tight against the entry of plastic between said surfaces and thereby to insure a smooth entry of plastic from the passageway 11 into the recess 26. However, if some flashing does occur between said surfaces, no harm will be done so long as it is not in such quantity as to inhibit the hereinafter-described further operation.

Therefore, with the removal device 6 in the position shown in FIG. 2, the occurrence of a molding operation within the mold 1 will cause a solid column of plastic to extend from the runner 9 through the passageway 11 and into the recess 26.

Figure 3:
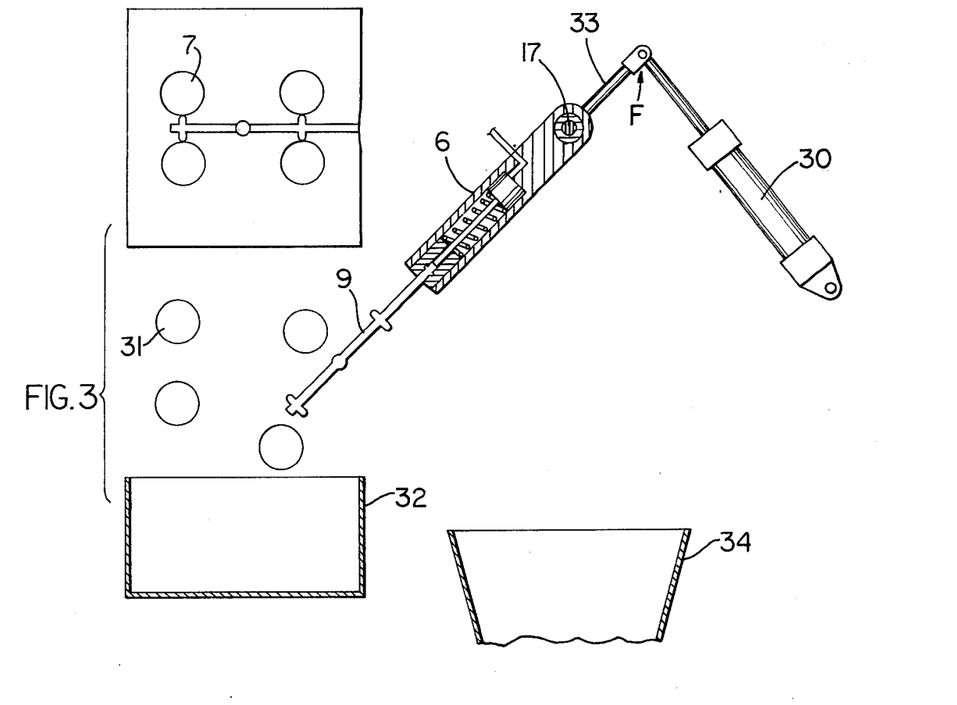
FIG. 3 is a view similar to that of FIG. 2 but showing the molded parts and runner system as same are being removed from the mold.
Figure 4:
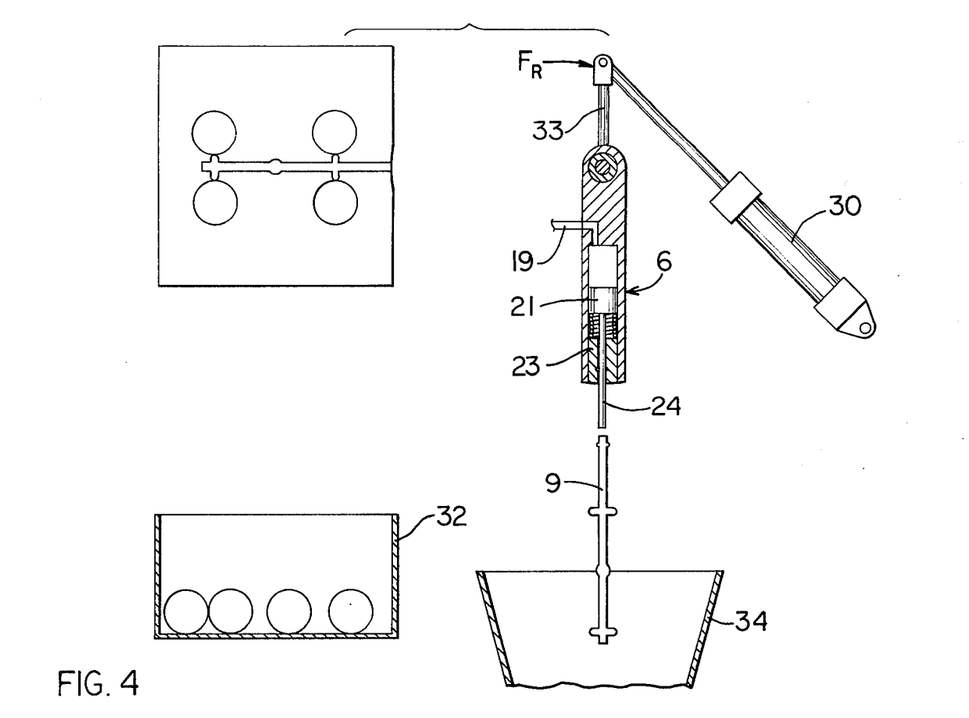
FIG. 4 is a view similar to that of FIG. 2 but showing the parts in the position for discharge of the runner system into collecting means.

In operation, a molding procedure occurs as just described and a portion of the runner extends into and is firmly gripped within said recess 26. Looking now at FIG. 3, the mold has opened, the molded parts from the cavities 7 have been by conventional means severed from the runner system R and said parts, of which one is indicated at 31, are falling by gravity from the mold into any suitable collecting means, generally indicated at 32. In the meantime, the sprue has been severed by presently known and conventional means from the injection nozzle close to the exit port of said nozzle. As mold half 3 moves away from the mold half 2 for release of the molded parts, the bracket 16 mounted thereon will carry the removal device 6 therewith and first both remove the runner 9 from the passageways in mold half 2 by which said runner is formed and also pull the sprue 8 out of the sprue opening in mold half 2. Such movement of the mold half 2 is conventional and carried out in present machines regardless of whether the molded parts and runner are removed manually, or are removed mechanically and permitted to drop into the single receptacle. When said runner and sprue are thus cleared, the removal device 6 is caused to rotate about the axis 17 and it carries the runner system R away from the mold and, as shown in FIG. 4, also away from an alignment with the parts receptacle 32. Said device 6 is caused to rotate by any convenient mechanism indicated generally by the arm 33 subjected to the force component F, such as an air cylinder 30. When the removal device 6 reaches the position of FIG. 4, pressure fluid will be caused to enter the conduit 19, thereby to drive the piston 21 toward and through the block 23, thereby causing the rod 24 to extend outwardly of said block. This drives the runner system completely free of the removal device 6 whereby it may drop into the receptacle 34 provided for same. The arm 33 is thereupon acted upon by a conventionally applied return force component $F_R$, such as by reversing the actuation of the cylinder 30, to return same to its FIG. 2 position and the cycle is ready to repeat. The spring 22 returns the piston 21 and rod 24 to their respective FIG. 2 positions.

FIGS. 5–8

It will be recognized, of course, that in the apparatus above described, the removal means will be synchronized in its cycle with the operational cycle of the mold. Thus, it is assumed that the mold can be permitted to remain open for the length of time required to move the removal device from the position of FIG. 2 to the position of FIG. 4 and return. This will often be true, particularly if the mold requires inspection between molding cycles and/or requires intermediate operations such as the spraying of a coating material, separating material thereinto or other treatment.

However, where the mold is able to operate at a cycle faster than that of the removal device, then it will be preferable to use the turret apparatus shown in FIGS. 5–8.

Figure 5:
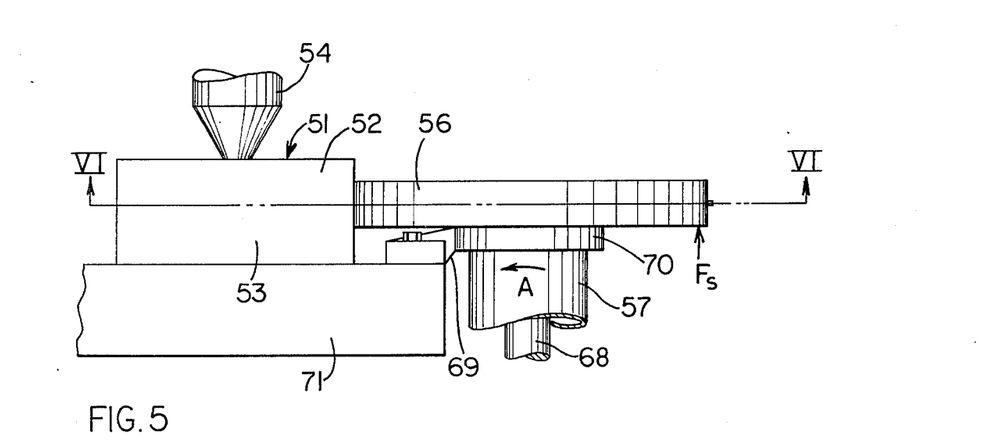
FIG. 5 is a view similar to FIG. 1 but showing a molding means in association with a turret type of removal device.

FIG. 5 is generally similar to FIG. 1 in representing a conventional mold 51 having mold halves 52 and 53 and conventionally associated with the discharge end of a plastic injection cylinder 54. As in the case of FIG. 1, said mold halves will be assumed to be vertically oriented but insofar as the invention is concerned, they could be horizontal if appropriate means are employed for ejecting the molded parts therefrom.

In this case, however, the removal device 6 of FIGS. 1-4 is replaced by a rotary turret 56 mounted for rotation on a hollow shaft 57 about an axis 58 which latter corresponds functionally to the axis 17 of FIGS. 1-4. The rotation of said turret may be effected in any convenient manner by application of an intermittently effective, suitably sequenced rotative force A thereto. The turret 56 contains a central opening 59 from which extends radially to the peripheral surface thereof a plurality of openings of which one is indicated at 61. Rods, of which one is indicated at 62, extend through said radial openings and correspond to the rod 24 of FIGS. 1-4. In this embodiment, said rods extend through appropriate guide or bearing blocks 63 and 64 which are provided to insure accurate guiding thereof and which thereby enable the central portion of the opening 61 to be somewhat enlarged for the reduction of friction. The length of the rod 62 is such that in the retracted position shown at the 270° position in FIG. 6, there is provided a recess 66 corresponding to the recess 26 of FIGS. 1-4 but in the extended position of the rod shown in the 90° position of FIG. 6, said rod projects beyond the peripheral surface of the turret 56.

Any desired means may be provided for operating said rods including properly sequenced hydraulic or air actuating means, but it is sufficient for illustrative purposes to refer in this embodiment to a cam 67 which is fixed in position by any convenient means, such as a central post 68 (FIG. 5) with the turret 56 rotating concentrically therewith on and by means of a sleeve shaft 57.

Said turret 56 is mounted in any convenient manner to the movable mold half 53, or to the means by which same is supported and moved. For illustrative purposes, this is indicated schematically by a bearing housing 70 encircling and providing at least support for the rotatable sleeve shaft 57. Bearing housing 70 is then mounted as desired, such as by bracket means 69, onto the movable mold part 53 as here shown or if preferred same may be mounted on the platen 71 on which the movable mold half 53 is also mounted.

The operation of this apparatus is essentially similar to that already described in connection with FIGS. 1-4 but may be reviewed briefly.

Figure 6:
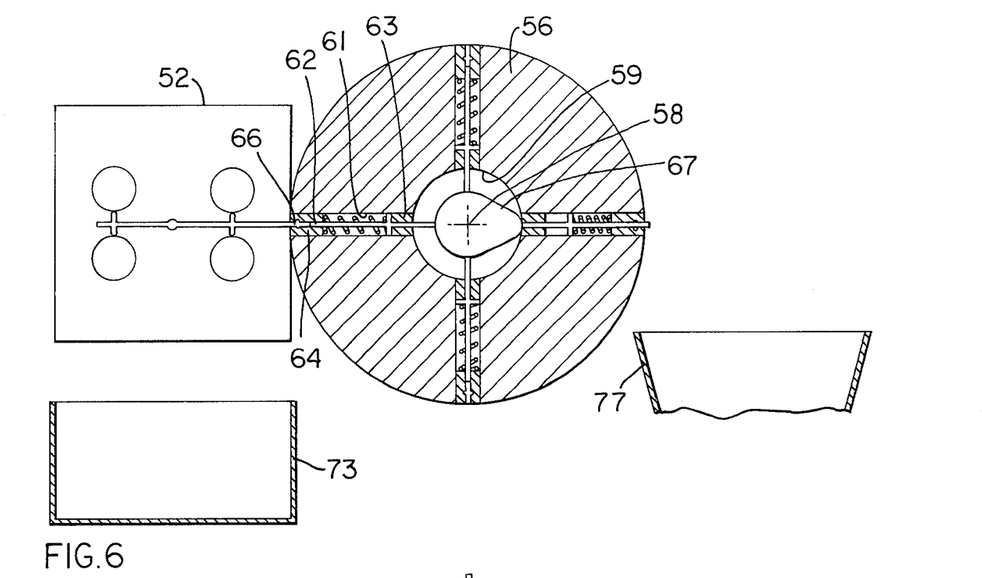
FIG. 6 is a section taken on the line VI—VI of FIG. 5 and showing the parts immediately following the filling of the mold cavities.

In FIG. 6, there is shown the mold half 52 with the cavities and runners filled and with a portion of the plastic from the runner entering into the recess 66 whereby to connect said runner firmly to the guide block 64 within the turret 56.

Figure 7:
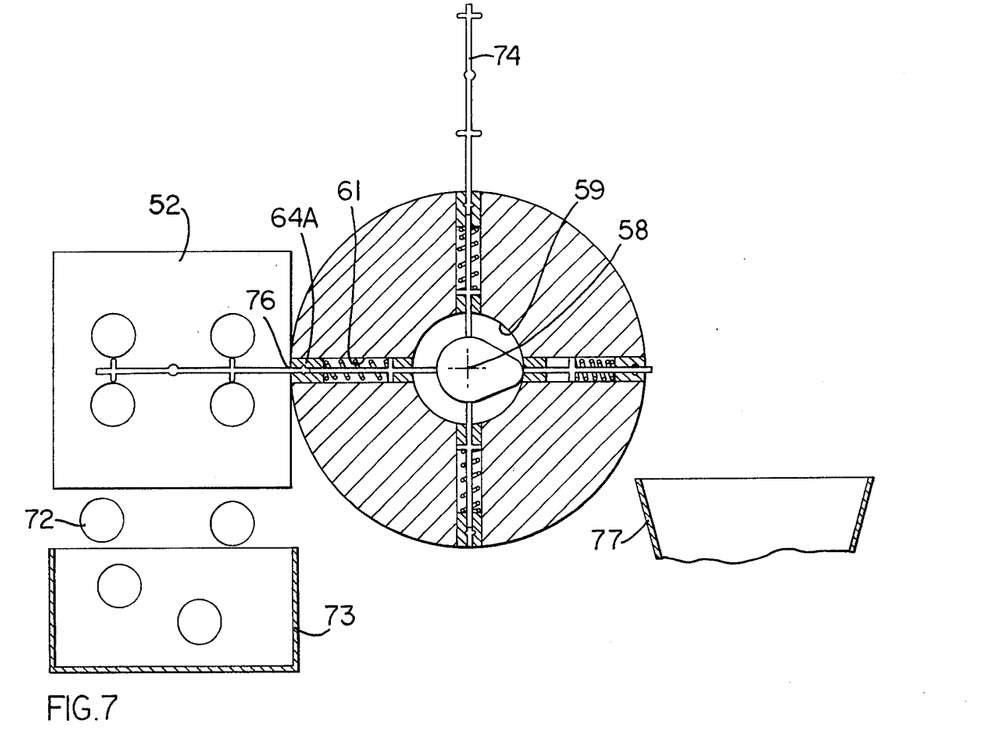
FIG. 7 is a view similar to FIG. 6 showing the position of the molded parts and the runner system as same are being removed from the mold and with the mold and removing device ready for the commencement of another molding cycle.

FIG. 7 shows the next step in the operational cycle, namely the molded parts of which one is indicated at 72 being separated from the runner, ejected from the mold and falling by gravity into a suitable collecting means 73. In the meantime, the runner from the FIG. 6 position now appears at 74 in FIG. 7 with a new guide block 64A and associated rod structure being presented to the runner port 76 for the reception of plastic in the next molding cycle.

Figure 8:
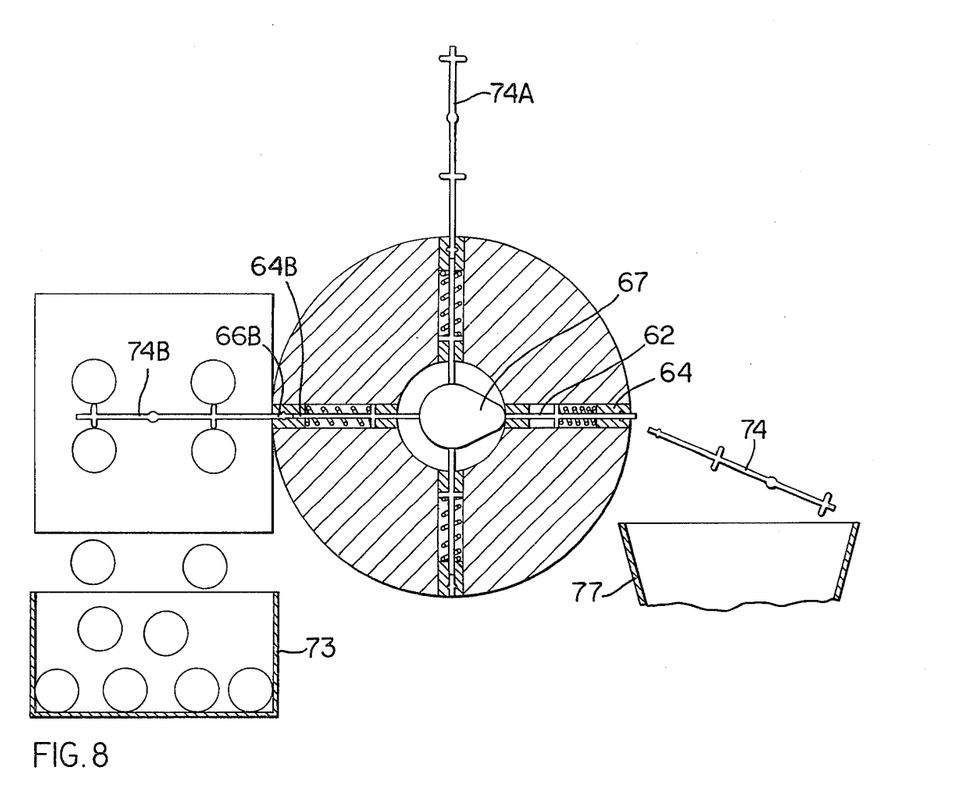
FIG. 8 is a section similar to FIG. 6 and showing a subsequent stage in the molding and runner system removal operation.

FIG. 8 shows the next step in the cycle wherein the runner 74 has now reached the 90° position and the cam 67 has urged the rod 62 radially outwardly to drive said runner 74 out of the guide block 64 to enable it to drop into a suitable collecting device 77. In the meantime, the runner which appeared in the mold immediately following the stage shown in FIG. 7 now appears at 74A in FIG. 8 and plastic is being introduced into the mold to again form molded parts and a further runner 74B which as before is entering into the recess 66B of the guide block 64B.

By such means, the runners of even a high speed mold can be rapidly extracted from the mold and delivered to collecting means and thereby separated from the molded parts.

As in the case of the embodiment of FIGS. 1-4, the runners may be formed entirely within a groove in the mold half 52 with no corresponding groove at all in the mold half 53. Thus, when the mold half 53 and the turret 56 move away from the mold half 52, the runner and sprue will be entirely free to follow the rotation of said turret. However, if it is preferred, as it will be in some instances, to define the runners by grooves in both the mold halves 52 and 53, then it will normally be preferable to effect a slight movement of the turret 56 back toward the mold half 52 after the initial movement away therefrom. In other words, the turret 56 is first caused to move away from the mold half 52 sufficiently to withdraw the sprue therefrom and then move away from the mold half 53 sufficiently to move the runners out of any runner defining grooves which may exist in the mold half 53. This latter may be accomplished in any convenient manner, by application of a suitable release force $F_S$ onto the rotor 56 with appropriate provision for axial movement provided in the sleeve shaft 57 and possibly also post 68. Such force $F_S$ may be applied in any of several ways, such as by a suitably operated and sequenced pressure cylinder or by the means which operate the knockout pins in the mold half 53.

Figure 9:
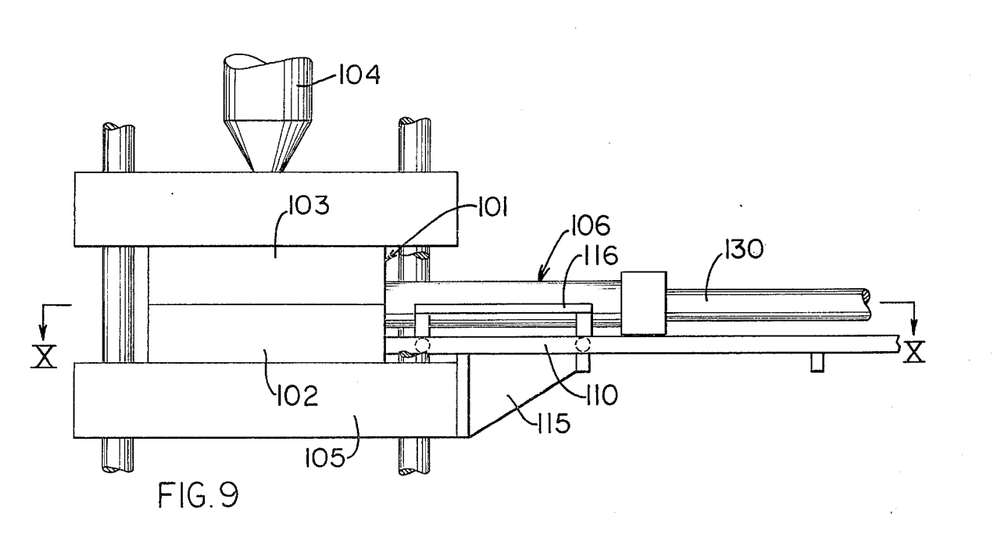
FIG. 9 is a view generally similar to FIG. 1 but illustrating also alternate mounting for the removal device.
Figure 10:
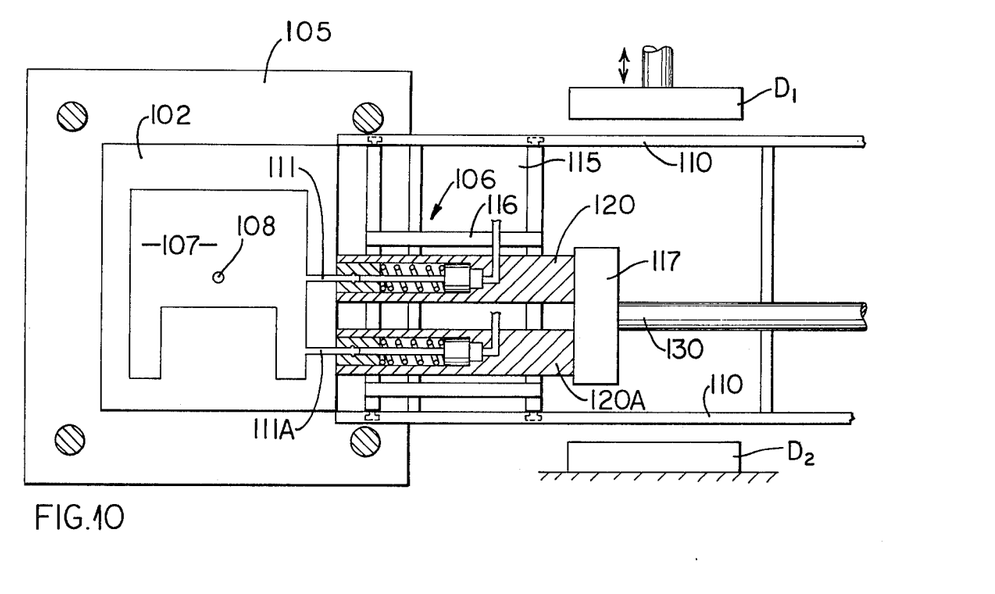
FIG. 10 is a view generally similar to FIG. 2 of the embodiment of FIG. 9 illustrating a number of structural variations in the application of the broad idea of the invention.

FIGS. 9 and 10

In FIGS. 9 and 10, there are schematically illustrated a number of further modifications of the apparatus for adapting same to other uses.

In FIG. 9, there is shown in a manner generally similar to FIG. 1 a pair of molds 101 comprising a fixed mold half 103 and a movable mold half 102. Said fixed mold half is operatively associated with the discharge portion 104 of an injection cylinder and the movable mold half is operatively associated with an appropriate platen 105. The removal device 106 is here mounted for reciprocating movement toward and away from the mold 101 and may be supported as desired either upon wheeled carriage means 116 or upon means, such as an operating cylinder, by which the reciprocatory movement aforesaid is applied to the removal device 106. Said carrige 116 may be operated upon tracks 110 which are in turn mounted by a bracket 115 on the platen 105 or same may be floor supported if preferred.

The interior of the removal means 106 is the same as that described above in more detail in connection with FIGS. 1-4 and hence such description need not be repeated.

It will be noted, however, that in this instance only a single mold cavity 107 is shown which is shown as a large cavity, such as for a television cabinet, and there are provided a plurality, here two, of passageways 111 and 111A for connection of such molded component, rather than a runner as in the case of the preceding described figures, to the removal apparatus 106. The sprue opening 108 is in this instance assumed to be directly into the mold cavity 107.

The removal means 106 here comprises a pair of devices 120 and 120A which are both mounted on a single crosshead 117 which is in turn mounted either pivotally as above described in connection with FIGS.

1-4 (either omitting or in combination with the carriage 116) or, as shown in FIGS. 9 and 10, may be mounted on such a carriage and operable by a reciprocable rod 130. Said rod 130 is then mounted and actuated in any conventional manner for reciprocation in appropriate synchronism with the opening and closing of the mold halves 102 and 103 as desired. It will be apparent that as many units similar to the unit 120 may be utilized as required for the effective support and control of the molded parts.

During a molding operation, the flowable plastics material may as already described above flow through the passageways 111 and 111A into and for engagement with the housings 120 and 120A in the manner already described above. As the mold opens, the sprue may be automatically severed from the molded part for later removal and as desired or upon proper movement of the removal means with the movable mold 102 as already above described, the sprue can be carried with the molded part for subsequent severing as convenient. Whether or not the sprue is separated from the molded part at this point, in the embodiment of FIGS. 9 and 10 it is assumed that the molded part 107 will be moved laterally from the mold to further processing means which are here indicated as trim dies $D_1$ and $D_2$. However, other processes may be performed as desired upon the molded part 107 while same is retained under the control of the removal means 106. When such operations are completed, the cylinders within the housings 120 and 120A will be actuated in the same manner as already above described and the component held thereby will be released.

Although particular preferred embodiments of the invention have been disclosed in detail for illustrative purposes, it will be recognized that variations or modifications of the disclosed apparatus, including the rearrangement of parts, lie within the scope of the present invention.

I claim:

1. An apparatus for separating a runner system from molded parts produced in an injection-type mold having first and second cooperating mold halves;

at least one of said mold halves having recesses therein defining at least one mold cavity and a runner system passage connected with said mold cavity, at least one of said mold halves being movable to open said mold cavity;

removal means positioned adjacent said mold and having means establishing a physical connection with said runner system passage, said removal means being operable after said mold is opened to conduct said runner system away from said mold to one collecting zone while the molded parts are permitted to exit from said mold for collection in a different collecting zone, said removal means being a center-mounted rotatable turret whose peripheral surface bears against a peripheral surface of said mold at a port through which said runner system passage opens, said turret carrying a plurality of radially positioned circumferentially spaced openings in its peripheral surface, and a corresponding plurality of rods normally recessed in said openings, and actuating means causing said rods to shift radially outward in said openings successively as the latter attain a preselected discharge position in their orbital movement spaced away from said port.

2. The device defined in claim 1 including a central opening within said turret, said actuating means comprising a fixed cam within said central opening, and means for urging the radially inner ends of said rods to follow said cam for retraction of said rods successively as said recesses register with said port, said cam causing said rods to move into said recesses successively as said recesses attain said preselected discharge position.

3. Apparatus for separating a runner system from an injection-type mold and a product produced therein, comprising:

a mold having mold halves enclosing therebetween a laterally extending mold cavity and runner passage, said runner passage extending from said mold cavity laterally between the mold halves and having an outer end opening through a lateral face of said mold between said mold halves;

removal means having an elongate opening therein and further having a rod normally retracted within said removal means opening to define a recess at the outer end of such opening, and means independent of mold opening and closing for advancing said rod along the axis of said recess toward the outer end of said removal means opening, said removal means having a first position beside said lateral mold face with said removal means opening and rod laterally extending away therefrom and from the outer end of said mold runner passage as a continuation thereof, such that molding material filling said cavity forms a runner system extending continuously through said mold runner passage and into said removal means opening, and opening of said mold frees the runner system from said runner passage while leaving such runner system supported on said removal means by the part thereof formed in said recess, means located with respect to said mold and mounting said removal means for movement from said first position beside said mold laterally away from said lateral mold face to a second position at which said removal means opening is spaced laterally away from said mold by a distance sufficient to clear the runner system from the mold, whereby an advancement of said rod will push the opposed end of said runner out of said removal means opening and thus release said runner from said removal means.

4. The apparatus of claim 3 in which said removal means includes a chamber communicating with the interior end of said removal means opening and into which said rod is extendable, a pressure fluid actuated piston within the chamber and engageable with the inner end of said rod and responsive to application of fluid pressure thereto for pushing said rod outward along said opening to eject said runner system from said removal means.

5. The apparatus according to claim 4 in which said removal means further includes a block closing the outer end of said chamber and through which said opening extends, and a spring compressible between said block and piston in said chamber for retracting said piston away from said opening and therewtih permitting retraction of said rod to its recessed position within said opening, such that for ejection of said runner system from the removal means opening, pressure fluid actuation of said piston compresses the spring.

6. The apparatus of claim 3 in which said removal means comprises a series of said openings, and a plurality of said rods receiprocable in corresponding ones of said series of openings, said removal means being movable with respect to said mold for sequentially presenting said series of openings to said mold opening, and a common cam sequentially engaged by the inner ends of said series of rods at said second position of each said rods for sequentially ejecting runner systems from said series of openings.

7. The apparatus according to claim 3 including at least one said removal means said mounting means comprising a carriage supporting same for movement between said first position where said removal means engages said mold and a said second position remote from said mold, guide means extending away from said mold substantially in parallel with said removal means opening for guiding said carriage between said first and second positions, said first and second positions being aligned substantially in the plane of separation of said mold halves.

8. The apparatus of claim 3 in which said rod substantially lies in and is mounted for reciprocation substantially in the plane of mold half separation.

9. Apparatus for separating a runner system from an injection-type mold and a product produced therein, comprising:

a mold having mold halves enclosing therebetween a mold cavity and a runner passage, said runner passage extending from said mold cavity between the mold halves and having an outer end opening through an exterior face of said mold between said mold halves;

removal means having an opening therein, said removal means having a first position adjacent said exterior mold face with said removal means opening located at the outer end of said mold runner passage as a continuation thereof, such that molding material filling said cavity forms a runner system extending continuously through said mold runner passage and into said removal means opening, at least one of said mold halves being movably mounted with respect to said first removal means position and other mold half for opening and freeing the runner system from said runner passage while leaving such runner system supported on said removal means by the part thereof formed in said removalmeans opening, said removal means being mounted for movement from said first position away from said mold to a second position at which said removal means opening is spaced away from said mold, said removal means further having a rod normally retracted within said removal means opening to define a runner system support recess extending to the outer end of such opening, said rod being mounted for movement along said runner support recess toward said outer end of said removal means opening over a distance sufficient to displace a runner out of said removal means opening and thus release said runner from said removal means, said removal means comprising an elongate housing through one end of which said opening extends, and along which said rod is reciprocable, the other end of said housing being pivotally mounted remote from said mold, and a motor means fixedly mounted with respect to said pivot point and also fixed to said elongate housing and actuable to pivot said housing about said pivot point to swing said one housing end away from said mold.

* * * * *